Jan. 1, 1946.  M. J. FETT  2,392,035

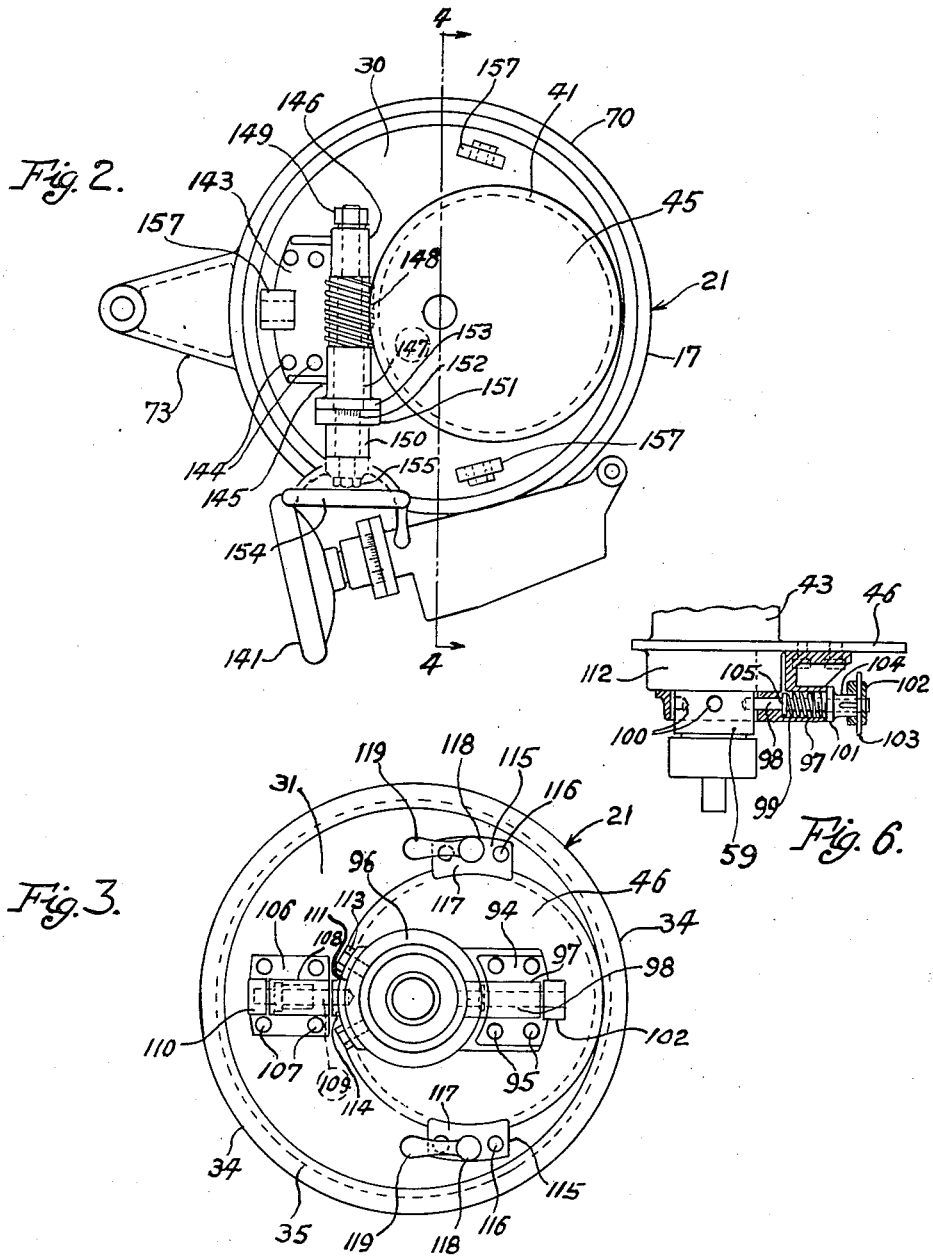

MACHINE TOOL SUPPORT

Filed March 23, 1943  3 Sheets-Sheet 3

Inventor
MATTHEW J. FETT.
By Barthel & Bugbee
Attorney

Patented Jan. 1, 1946

2,392,035

UNITED STATES PATENT OFFICE 2,392,035

MACHINE TOOL SUPPORT

Matthew J. Fett, Detroit, Mich.; Magdalene Fett administratrix of said Matthew J. Fett, deceased Application March 23, 1943, Serial No. 480,171

4 Claims. (Cl. 90—16)

The present invention relates to machine tools and, more particularly, to a tool carrier capable of eccentric movement.

The primary object of the invention is to provide a tool head or carrier which can be moved in various arcuate paths and which may be adjusted in predetermined positions to hold the tool at the set location while the work is being moved relative thereto.

Another object of the invention is to provide a machine tool capable of being bolted to the head of a milling machine or the like in such a manner as to facilitate adjustment of the tool about a horizontal axis whereby the tool will be presented to the work in angular relation thereto.

Another object of the invention is to provide a machine tool capable of movement as set forth in the preceding objects and to provide means for locking the tool in a centered position as well as various positions of eccentricity.

Another object of the invention is to provide a machine tool of the above mentioned character with manual adjusting and setting means capable of being disengaged to facilitate quick setting of the tool about arcuate pathways in a relatively short time, thereby preventing unnecessary manipulation of the adjusting and operating means when setting the tool to various positions.

Another object of the invention is to provide a machine tool applicable to high speed milling operations including a series of hollow cast sleeve members with means for reenforcing said sleeve members longitudinally and radially to thereby provide a relatively light and sturdy construction.

Another object of the invention is to provide a machine tool of the above mentioned type with a unique and novel motor drive mounting whereby the motor may swing in a horizontal plane to accommodate various positions of movement of the machine tool during its setting and adjustment.

Another object of the invention is to provide a machine tool of the above-mentioned character in which the eccentric sleeves are slidably received one within the other and are slightly tapered to compensate for wear occurring between the movable surfaces and to provide means for taking up such wear to increase the accuracy of the machine tool and to provide a machine tool having a high degree of precision.

Other objects and advantages of the invention will become apparent during the course of the following description of the accompanying drawings, wherein:

Figure 2 is a top plan view illustrating in detail the position and location of the manual control and adjusting means for the various eccentric sleeves;

Figure 3 is a bottom plan view of the machine tool illustrating in detail the location and arrangement of the various locking means for holding the eccentric sleeve in adjusted predetermined position;

Figure 1:
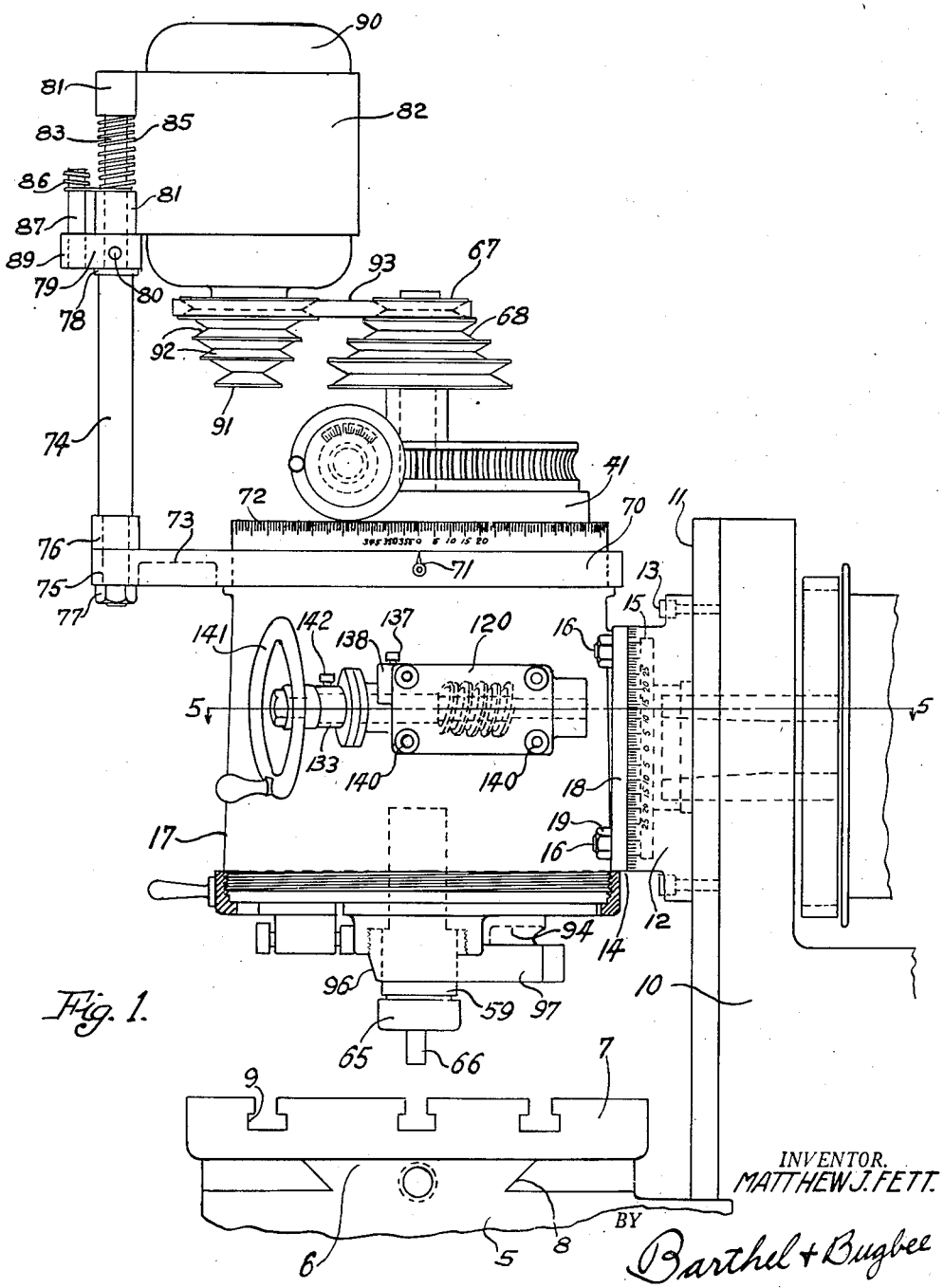
Figure 1 is a side elevational view of a machine tool embodying the invention illustrating the manner in which the same is attached to a milling machine.
Figure 5:
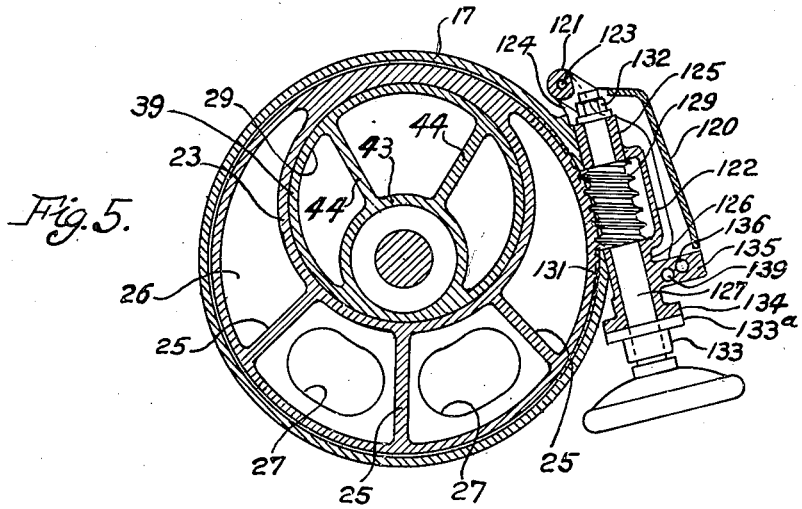

Figure 5 is a horizontal cross sectional view taken on line 5—5 of Figure 1 looking in the direction of the arrows and illustrating in detail the manner in which the quick-setting manual operating member is releasably held in driving engagement with one of the eccentric sleeves; and Figure 6 is a fragmentary side elevational view of the lower portion of the machine tool showing an area broken away to illustrate in detail the structural features of one of the locking members for maintaining the spindle in centered position.

Referring to the drawings, in detail, Figure 1 shows a milling machine having a bed 5 with a dove-tailed way 6 for slidably receiving a work support 7. The work support 7 is provided with a dove-tailed way 8 to facilitate sliding movement between the base and work support. Longitudinal slots 9 are formed in the bed 7 for the reception of bolts or the like for the purpose of tying the work down to said base or bed.

The machine frame 10 is of conventional construction and includes an upright portion 11 to which is bolted a calibrated drum 12 as by means of bolts 13. The peripheral portion of the drum 12 is graduated as at 14 and said drum may be adjusted relative to the machine frame support 11 by manipulation of the bolts 13 and the opposite wall of the drum is provided with an annular recess 15 for receiving axially projecting bolts or the like as at 16.

Bolted to the drum 12 is a circular casting 17 having a tangential flange portion 18 suitably apertured for receiving the bolts 16 so that the hollow casting 17 may be held in place by nuts 19 threaded on the ends of the bolts 16. The cylindrical casting 17 is slightly tapered upwardly and is provided with an inner wall 20 likewise having a slight taper inwardly toward the axis of the cylindrical casting.

Rotatably mounted within the cylindrical casting is a hollow cast sleeve member generally designated by the reference character 21 (Figure 4) having an outer wall 22 tapered slightly to provide a snug fit with the tapered wall 20 of the cylindrical casting 17. Formed integral with the hollow cast member 21 is an eccentric sleeve 23 spaced from and connected to the outer cylindrical wall 24 by means of radially extending webs 25 adapted to reenforce the structure and provide a unitary hollow casting. The eccentric sleeve 23 and outer cylindrical wall 24 are further reenforced by means of a circular web 26 which likewise connects with the radial extending web 25 and are provided with openings 27 therebetween to allow removal of the core member during casting. The eccentric sleeve 23 is slightly tapered and is provided with an inner cylindrical taper surface 28 for rotatably receiving a second cylindrical member generally designated by the reference character 29, which will be hereinafter more fully described. The hollow cast sleeve member 21 is provided with upper and lower walls 30 and 31 which connect the upper and lower portions of the respective cylindrical wall 24 and eccentric sleeve, and the lower wall 31 is extended to provide an annular flange 33 adapted to underlie the lower edge of the cylindrical casting 17 so that a clamping ring 34 threaded on the lower end thereof may have its flanged portion 35 underlying the flange 33. The lower portion of the cylindrical casting 17 is screw-threaded as at 36 for receiving a correspondingly screw-threaded portion 37 on the internal surface of the clamping means 34 so that rotation of the handle 38 formed integral therewith may clampingly secure the hollow cast sleeve member 21 in position with respect to the cylindrical casting 17.

The second hollow cast sleeve member 29 (Figures 4 and 5) comprises an outer cylinder 39 the peripheral wall of which is likewise tapered to cooperate with the tapered wall of the eccentric sleeve 23 so that axial movement thereof will compensate for wear between the relative moving surfaces. It is to be noted that the hollow cast sleeve member 29 projects above the top wall surface 30 of the hollow cast sleeve member 21 and is threaded as at 40 for receiving an internally threaded clamping ring 41. The lower portion of the hollow cast sleeve member 29 is provided with an annular flange 42 adapted to underlie and engage the bottom wall 31 of the hollow cast sleeve member 21 so that rotation of the clamping means 41 will move the hollow cast sleeve member 29 axially and cause the surfaces to be frictionally held as desired.

Eccentrically positioned and formed integral with the cylindrical sleeve member 29 is an eccentric sleeve 43 connected to the outer cylindrical sleeve 39 by means of radially extending webs 44 similar to the webs 25. The webs 25 and 44 may extend the full length of the sleeves or they may terminate a slight distance from the upper and bottom portions thereof. The cylindrical sleeve 39 and eccentric sleeve 43 are connected at the top and bottom by radial walls 45 and 46 respectively and it is to be noted that the annular flange 42 is formed as an extension of the lower wall 46 in substantially the same manner as the flange 33.

Rotatably mounted within the eccentric sleeve 43 is a spindle 47 supported at the top by means of anti-friction members 48 which rest upon an internal flange 49 formed on the eccentric sleeve 43. The extreme upper edge of the eccentric sleeve 43 is internally threaded for receiving an externally threaded clamping ring 50 adapted to clamp the anti-friction bearing members 48 in place against the internal annular flange 49.

The spindle 47 is reduced and screw-threaded as at 51 for receiving a similar clamping ring 52 adapted to clampingly secure the inner race members of the anti-friction devices 48 against the shoulder 53 on the spindle 47.

The lower portion of the spindle 47 is supported in a similar manner and the eccentric sleeve 43 is provided with an internal annular flange 54 against which an upper anti-friction race member 55 is seated. A lower anti-friction race member 56 is held in position by means of an externally threaded clamping ring 57 and said anti-friction bearing members 55 and 56 are spaced by means of a sleeve 58. The lower portion of the spindle is enlarged as at 59 so that the shoulder 60 will engage the under surface of the inner race member of the lower anti-friction bearing member 56 and the spindle is threaded as at 61 for receiving clamping rings 62 and 63 adapted to engage the inner race member of the upper anti-friction bearing member 55. The extreme lower end of the spindle 47 is threaded as at 64 for receiving a clamping ring 65 which is adapted to control the suitable chuck jaws for gripping and holding a tool 66.

The extreme upper end of the spindle 47 is provided with a pulley 67 having a series of pulley grooves 68 on various diameters to selectively change the speed of the spindle 47 as desired.

Adjustably mounted on a flange 69 on the upper end of the cylindrical casting 17 is a supporting ring 70 (Figure 1) which is adapted to be held in position by means of a set screw or the like and said supporting ring 70 is provided with a pointer 71 adapted to register with a graduated scale 72 on the upper end of the cylindrical casting 17. The ring 70 may be moved by adjusting the same so as to position the pointer on the side or front of the machine whereby the operator may carry out milling operations from either angle without altering the various constructions.

Formed integral with the ring 70 is a radially extending arm 73 to which is secured an upstanding shaft 74 as at 75. The shaft 74 is provided with a collar 76 of a slightly increased diameter so that a nut 77 threaded on the lower end thereof may tightly secure the shaft 74 in place. The upper end of the shaft 74 is provided with an annular enlargement 78 upon which rests a set screw or the like as at 80. The collar 79 forms an abutment for one of a pair of hinge eyes 81 formed integral with a hinge leaf plate 82 and said hinge eyes are rotatably mounted on the reduced upper end 83 of the shaft 74. A coil spring 85 has one of its ends secured to the uppermost hinge eye 81 while the other end is coiled as at 86 about a pin 87 carried by an extension 89 on the collar 79. It will thus be seen that the tension of the coil spring 85 may be increased or decreased by simply loosening the set screw 80 and rotating the collar 79 as desired. A motor 90 is bolted or otherwise secured to the hinge leaf 82 and the armature shaft of the motor is provided with a pulley 91 having a series of pulley grooves 92 of various diameters. The pulley 91 is disposed adjacent the pulley 67 so that a drive belt 93 may be trained over the aligned pulley grooves 68 and 92. The spring 85 exerts its force in a direction to maintain the drive belt 93 in a taut condition.

Secured to the bottom wall 46 of the hollow cast cylindrical member 29 is a bracket plate 94 fastened in place by bolts or the like as at 95. The bracket plate 94 is provided with a circular offset extension 96 surrounding the lower portion 59 of the spindle and said circular extension is slightly spaced from the enlarged lower end portion 59 of the spindle 47 to permit relative rotation therebetween. Also formed integral with the bracket plate 94 is a tubular boss 97 having a projectable pin 98 (Figure 6), urged inwardly by means of a coil spring 99 to seat within diametrically disposed openings 100 in the enlarged end 59 of the spindle 47. The coil spring 99 is received in an enlarged bore in the tubular boss 97 and has one end engaging a restricted portion thereof while the opposite end engages a threaded nipple 101 through which the pin 98 projects. The extreme outer end of the pin 98 is provided with a finger piece 102 which is annularly recessed to overlie the nipple 101 so that a locking pin 103 may retain the pin 98 and finger piece 102 in a retracted position by resting upon the outer edge of the nipple 101. The nipple is provided with diametrically opposed longitudinally extending slots 104 for receiving the pin 103 and allowing the pin 98 to be projected by reason of the coil spring 99 exerting its force upon an annular shoulder 105 formed on the pin 98. By merely giving the finger piece 102 a partial turn the pin 103 will be aligned with the slot 104 and allow the projection of the pin 98 into one of the diametrically opposed recesses 100. In this manner, the spindle 47 may be locked against rotation to facilitate the insertion and removal of various milling and cutting tools 66.

A similar locking device is secured to the bottom wall 31 of the hollow cast sleeve member 21 and comprises a bracket plate 106 (Figure 3) held in place by bolts or the like 107. A tubular boss 108 is formed integral with the bracket plate 106 and is provided with a locking pin 109 similar in construction to the one shown in Figure 6. A knurled finger piece 110 is mounted on the outer end of the locking pin to accommodate retraction and projection thereof so that the free end of the pin may be aligned with an arcuate plate 111 secured to a downwardly extending extension 112 formed on the bottom wall 46, by means of bolts or the like 113. The arcuately curved plate 111 is provided with an apertured boss 114 to facilitate registration and alignment of the pin therewith so that the hollow cast cylindrical member 21 may be locked to the hollow cast cylindrical member 29 in such a manner that the spindle 47 is aligned in a centered position. It is to be noted that the locking pins 98 and 109 are arranged in vertical offset relation to allow free rotation of the hollow cast cylindrical members 21 and 29 and to prevent the tubular bosses 97 and 108 from abutting one another during rotation. In this manner, the spindle 47 may be retained on dead center so that the machine may be used for various milling operations and by simply retracting the pins 98 and 109 the hollow castings 21 and 29 may be rotated relatively to one another.

Also mounted on the bottom wall 31 of the hollow cast cylindrical member 29 is a pair of clamping plates 115 arranged at diametrical points with respect to the bottom wall 46 of the hollow cast cylindrical member 29. The clamping plates 115 are floatingly mounted on pins or screws 116 and are provided with offset flanged portions 117 adapted to overlie the flange 42 and be clampingly engaged therewith by means of manual control clamping members 118 having handles 119 to allow tightening of the clamping plate 115 when it is desired to adjust the hollow cast cylindrical member 29 in a predetermined position relative to the hollow cast cylindrical member 21, it being remembered that the clamping ring 34 facilitates the clamping or adjusting of the hollow cylindrical member 21 in any desired predetermined position with respect to the cylindrical casting 17.

Figure 4:
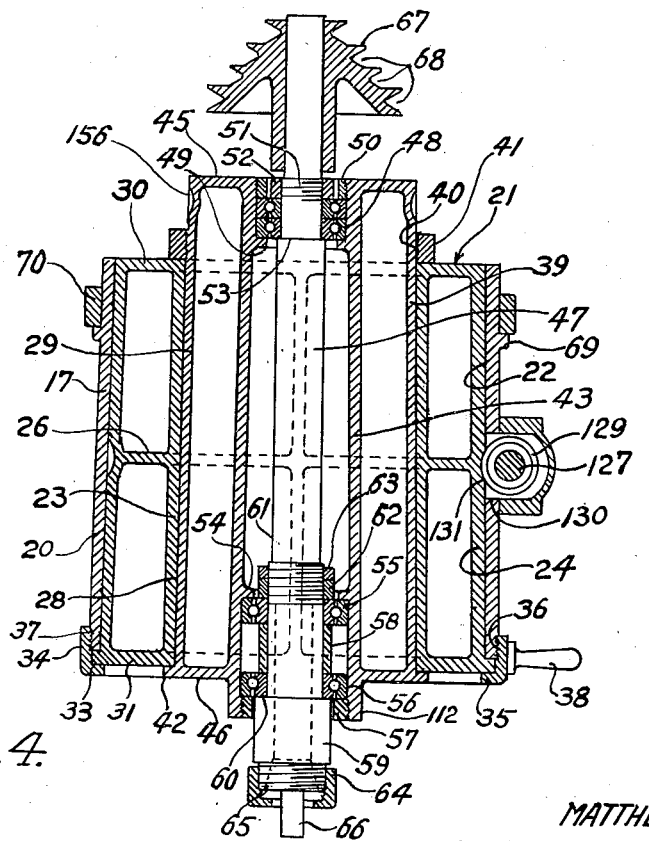
Figure 4 is a vertical cross sectional view taken on line 4—4 in Figure 2 looking in the direction of the arrows illustrating in detail the structural arrangement and formation of the various eccentric sleeves and showing the manner in which the same are slightly tapered to compensate for wear.

In order to manually rotate the hollow cast cylindrical member 21 relative to the cylindrical casting 17, a worm drive device is provided and comprises a housing 120 (Figures 1 and 5) bolted or otherwise secured to the peripheral wall portion of the cylindrical casting 17 and said housing is provided at one end with a pair of spaced hinge eyes 121, between which is hinged an integral casting 122 by means of a hinge pin 123. The hinge eyes 121 are slightly separated for receiving therebetween a gooseneck projection 124 of the integral casting 122 so that the integral casting may swing toward and away from the peripheral surface of the cylindrical casting 17. Formed on the integral casting 122 is a pair of spaced bearing members 125 and 126 for rotatably receiving a shaft 127 having keyed thereto between the bearings 125 and 126 a spiral worm 129. A portion of the cylindrical casting 17 is cut away as at 130 to expose the threads of the worm 129 for engagement with a series of gear teeth 131 formed on the peripheral surface of the hollow casting 21 between the upper and lower walls thereof, 30 and 31 respectively. One end of the shaft 127 is threaded for receiving a retaining nut 132 to prevent axial movement thereof while the opposite end is provided with a collar 133, having a graduated flange 133a engaging a collar extension 134 formed on the bearing boss 126 to thereby limit axial movement of the shaft 127 in the opposite direction. A marking may be formed on the collar extension 134 to register with the graduations when minute adjustments are being made. An extension 135 is formed on the integral casting 122 and is provided with an aperture 136 for receiving a pin 137 slidably carried in an extension 138 formed on the housing 120. As shown in Figures 4 and 5, the worm 129 is shown in engagement with the worm threads 131 formed in the hollow casting 21 but upon removal of the pin 137 from the opening 136 the integral casting 122 may be swung on its hinge pin 123 to move the worm 129 out of engagement with the worm teeth 131. The pin 137 may be dropped into a second opening 139 in the extension 135 to hold the integral casting 122 and the worm 129 in their disengaged position. Bolts or the like as at 140 may extend through the housing 120 to secure the same in position on the peripheral surface of the cylindrical casting 17 and a hand wheel 141 may be secured to the outer end of the shaft 127 to facilitate rotation thereof. The collar 133 may be held in place by a set screw or the like as at 142.

Similarly, the hollow cylindrical casting 29 may be rotated to various predetermined positions of eccentricity by means of a manipulator which comprises a base plate 143 (Figure 2) secured to the top wall 30 of the cylindrical hollow casting 21 by means of bolts or the like as at 144. The plate 143 is provided with spaced bearing bosses 145 and 146 for receiving a rotary shaft 147 upon which is mounted or keyed a worm 148. The shaft 147 is threaded at one end for receiving a pair of locking nuts 149 while the opposite end is provided with a collar 150 secured in place by a set screw or the like in substantially the same manner as the collar 133. The collar 150 is provided with an enlarged annular portion 151 having a graduated peripheral surface as at 152 adapted to register with a marking or the like on an annular enlarged portion 153 of the tubular bearing boss 145. A hand wheel 154 is secured to the shaft 147 by means of a nut 155 to facilitate rotation of the worm 148 about its axis. The worm 148 is adapted to mesh with a series of worm engaging teeth 156 formed on the upwardly extending portion of the hollow casting 29 so that rotation of the worm 148 will rotate the same relative to the hollow cylindrical casting 21.

The top wall 30 of the hollow cast cylindrical member 21 is provided with two or more circumferentially spaced lugs 157 (Figure 2) adapted to receive a bar or the like to facilitate the quick and easy rotation of the hollow cast cylindrical member 21 when the worm 129 is disengaged so as to position the cutter 66 in various locations. If desired, a short bar of metal or the like may be provided with a handle for this purpose when moving the hollow cast cylindrical member 21 to various rotational positions. In work requiring considerable accuracy the worms 129 and 148 are rotated by their respective hand wheels 141 and 154 so that a higher degree of accuracy or precision may be obtained and, if desired, various settings on the collars 133, 134 and 151, 153 may be predetermined so that movement of the hollow cast cylindrical members 21 and 29 may be facilitated to various degrees of eccentricity.

It is to be understood that the form of the invention herewith shown and described is to be taken as a preferred embodiment of the same and that various changes in the shape, size and arrangement of the parts may be resorted to without departing from the spirit of the invention or the scope of the subjoined claims.

What I claim is:

1. A machine tool, comprising a cylindrical support arranged with the axis extending vertically, a rotatable sleeve mounted in said support having an eccentric bore likewise, a second rotatable sleeve mounted within the eccentric bore and having an eccentric bore, a tool spindle rotatably supported in the second mentioned eccentric bore and extending above and below said cylindrical support, a motor rockably supported on said cylindrical support and drivingly connected with said spindle to accommodate free movement thereof in various positions of eccentricity, said sleeves and bores being tapered with an upward convergence to compensate for wear therebetween, manual control means for independently rotating said sleeves to predetermined positions, means carried by said cylindrical support for locking said first-mentioned sleeve in a predetermined position, and means carried by said first-mentioned sleeve for locking said second-mentioned sleeve in an adjusted position, at least one of said rotating means being disengageable to facilitate quick setting of said sleeves and spindle to various new locations of adjustment, said locking means being operable independently one from the other to permit the adjustment of either sleeve.

2. A machine tool, comprising a cylindrical support arranged with its axis extending vertically, a rotatable sleeve mounted in said support having an eccentric bore, a second rotatable sleeve mounted within the eccentric bore and likewise having an eccentric bore, a tool spindle mounted in the last mentioned eccentric bore and having a portion projecting above said cylindrical support, said cylindrical support and rotatable sleeve having cooperating tapered surfaces of upward convergence and being movable relatively one to the other to compensate for wear therebetween, a motor rockably and drivingly connected to said spindle, means for urging the motor away from said spindle to facilitate various movements of eccentricity thereof, manual means for independently rotating said sleeves to positions of predetermined adjustment, means for locking said sleeves in their predetermined positions and means for centering said tool spindle relative to the axis of said cylindrical support and locking the same against rotation.

3. A machine tool, comprising a cylindrical support arranged with its axis extending vertically, a rotatable sleeve mounted in said support having an eccentric bore therein, a second rotatable sleeve mounted within the eccentric bore likewise having an eccentric bore, said sleeve being slightly tapered with the taper of upward convergence to compensate for wear and provide a snug fit and to facilitate free rotation of one with respect to the other, a rotatable tool spindle supported in the last mentioned eccentric sleeve projecting above and below the cylindrical support, a motor rockably carried by the cylindrical support drivingly connected with the upper end of said spindle, adjustable spring means for urging said motor in a direction away from said tool spindle to facilitate movement of the tool spindle in positions of eccentricity and maintain driving connection between the motor and said spindle, a manual sleeve rotating worm operatively engaging worm teeth formed on the periphery of the first mentioned cylindrical rotatable sleeve to rotate said sleeves and tool spindle to various new positions of adjustment, means for moving said manual worm operating means out of engagement with said worm teeth to quickly shift said sleeves to various new positions of eccentricity and adjustment, means for locking said sleeves in various positions of adjustment independent one from the other and means for locking said spindle in a centered position relative to the cylindrical support.

4. A machine tool, comprising a cylindrical support having a tapered bore, a rotatable sleeve mounted in said support having a tapered wear surface complementary to said tapered bore and having an eccentric tapered bore therein, a second rotatable sleeve mounted in the eccentric bore of said first-mentioned sleeve and having a tapered cooperating wear surface for engagement therewith, said second mentioned rotatable sleeve having formed therein an eccentric bore, a tool spindle rotatably mounted in the last mentioned eccentric bore projecting above and below said cylindrical support, means for tightening said tapered surfaces to compensate for wear between the respective rotatable wear surfaces of the cylindrical support, first mentioned rotatable sleeve and second mentioned rotatable sleeve, a motor rockably mounted on said cylindrical support and drivingly connected with said spindle, a manual operating worm hingedly supported on said cylindrical support engageable and disengageable with worm teeth formed on the peripheral surface of said first mentioned rotatable sleeve, means for locking the sleeves against rotation independently of each other and means for locking the spindle in a centered position against rotation with respect to the cylindrical support.

MATTHEW J. FETT.